March 15, 1966    S. D. HARSHBERGER ETAL    3,240,847
METHOD OF FORMING PLASTIC BLOCKS Original Filed July 17, 1963      3 Sheets-Sheet 1

INVENTORS
Samuel D. Harshberger
Paul F. McKee
BY Charles F. Fay
Wm. Steell Jackson and Sons
ATTORNEYS March 15, 1966  S. D. HARSHBERGER ETAL  3,240,847
METHOD OF FORMING PLASTIC BLOCKS
Original Filed July 17, 1963  3 Sheets-Sheet 2

INVENTORS
Samuel D. Harshberger
Paul E. McKee
Charles F. Fay
BY Wm. Steell Jackson and Sons
ATTORNEYS.

March 15, 1966 S. D. HARSHBERGER ETAL 3,240,847
METHOD OF FORMING PLASTIC BLOCKS
Original Filed July 17, 1963 3 Sheets-Sheet 3
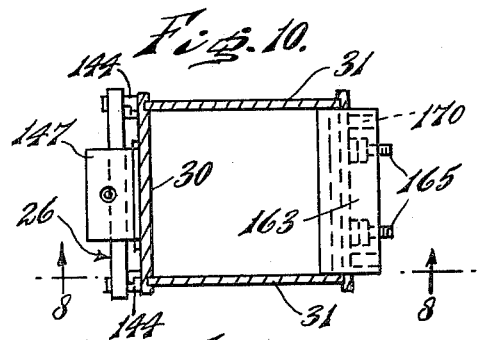
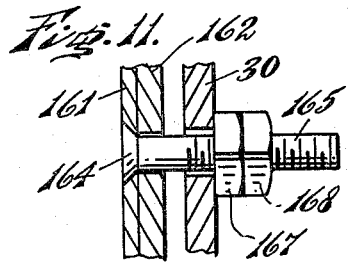
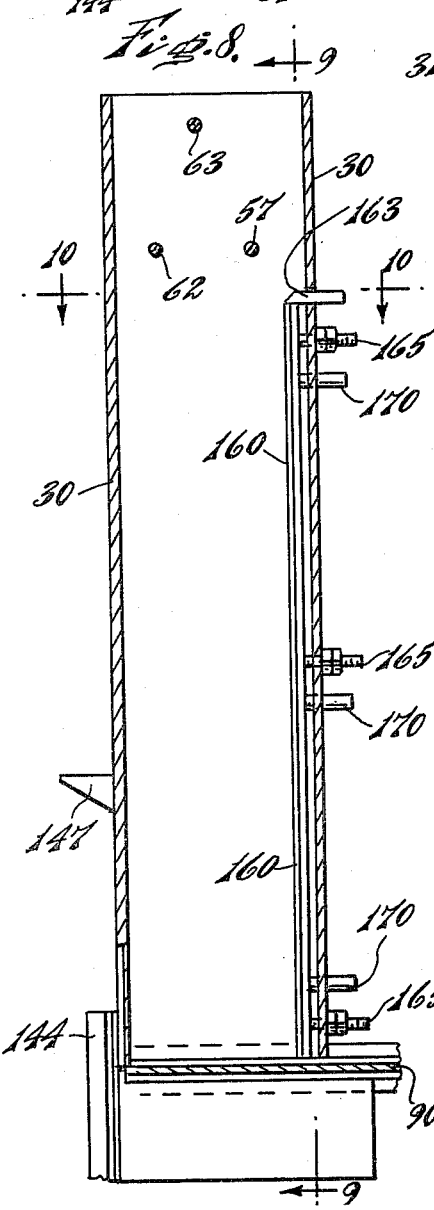
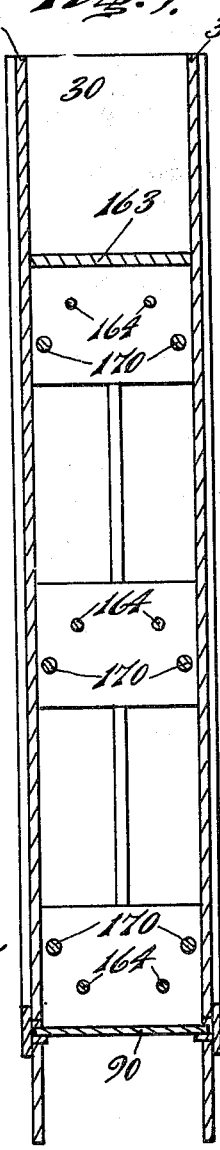
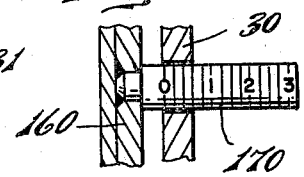
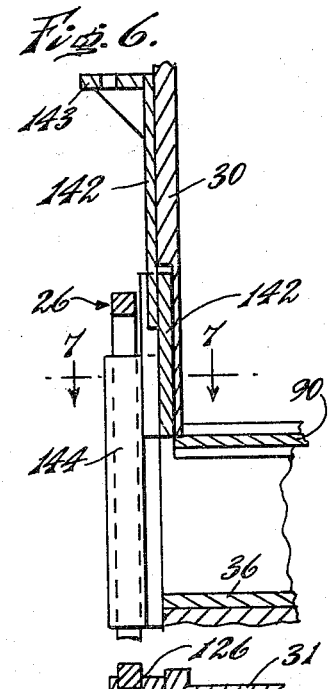
INVENTORS
Samuel D. Harshberger
Paul E. McKee
BY Charles F. Fay
Wm. Steell Jackson and Sons
ATTORNEYS United States Patent Office 3,240,847
Patented Mar. 15, 1966

3,240,847
METHOD OF FORMING PLASTIC BLOCKS
Samuel D. Harshberger and Paul E. McKee, Claysburg, Pa., and Charles F. Fay, Warren, Ohio; Florence L. Harshberger, executrix of said Samuel D. Harshberger, deceased, assignors to General Refractories Company, Philadelphia, Pa., a corporation of Pennsylvania
Original application July 17, 1963, Ser. No. 295,704. Divided and this application Oct. 7, 1964, Ser. No. 402,227
1 Claim. (Cl. 264—71)

The present application is a division of our copending application Serial No. 295,704 for Plastic Block Forming Machine.

The present invention relates to a method of forming plastic blocks and especially to a method designed to transform coarse chunks of plastic refractory material into blocks of uniform weight and dimension.

A purpose of the invention is to transform coarse chunks of plastic refractory material taken from a mixing pan into blocks of uniform weight and dimension which are sliced for easy handling in a simple manner which uses very little power.

A further purpose is to transform coarse chunks of plastic refractory into blocks of uniform weight and dimension in a continuous process.

A further purpose is to transform coarse chunks of plastic refractory taken from a mixing pan into blocks of uniform weight and dimension which are sliced for easy handling by forming the refractory into a rectangular cross sectional length by vibration and then slicing segments of the length into small blocks.

A further purpose is to feed coarse chunks of plastic refractory into a vertical stack or channel having a movable bottom, while vibrating the stack to compact the plastic material and then to slice off a portion of the compacted plastic which is subsequently forced through oscillating cutting wires in a direction normal to the travel of the plastic through the stack.

A further purpose is to shred the plastic material as it passes through the forming chute.

A further purpose is to control plastic feed into the forming chute in response to the height of the plastic material in the chute.

A further purpose is to utilize the relatively heavy weight of the plastic refractory material to compact the material into blocks.

A further purpose is to form plastic blocks of selectively different sizes.

Further purposes appear in the specification and in the claims.

In the drawings we have chosen to illustrate one only of the numerous embodiments in which our invention may appear, selecting the form shown from the standpoint of convenience in illustration, satisfactory operation and clear demonstration of the principles involved.

FIGURE 4 is a partial top plan view of the machine of the invention.

FIGURE 5 is a partial vertical section showing the shredder in the forming chute.

FIGURE 6 is an enlarged fragmentary vertical section showing the lower front end of the forming chute.

FIGURE 7 is a section taken on the line 7—7 of FIGURE 6.

FIGURE 8 is a vertical section of the forming chute of a modified embodiment of the invention taken on the line 8—8 of FIGURE 10.

FIGURE 9 is a vertical section taken on the line 9—9 of FIGURE 8.

FIGURE 10 is a plan section taken on the line 10—10 of FIGURE 8.

FIGURE 11 is an enlarged fragmentary vertical section of the guide bolts of FIGURE 8.

FIGURE 12 is an enlarged vertical section of the graduated rod of FIGURE 8.

Figure 1:
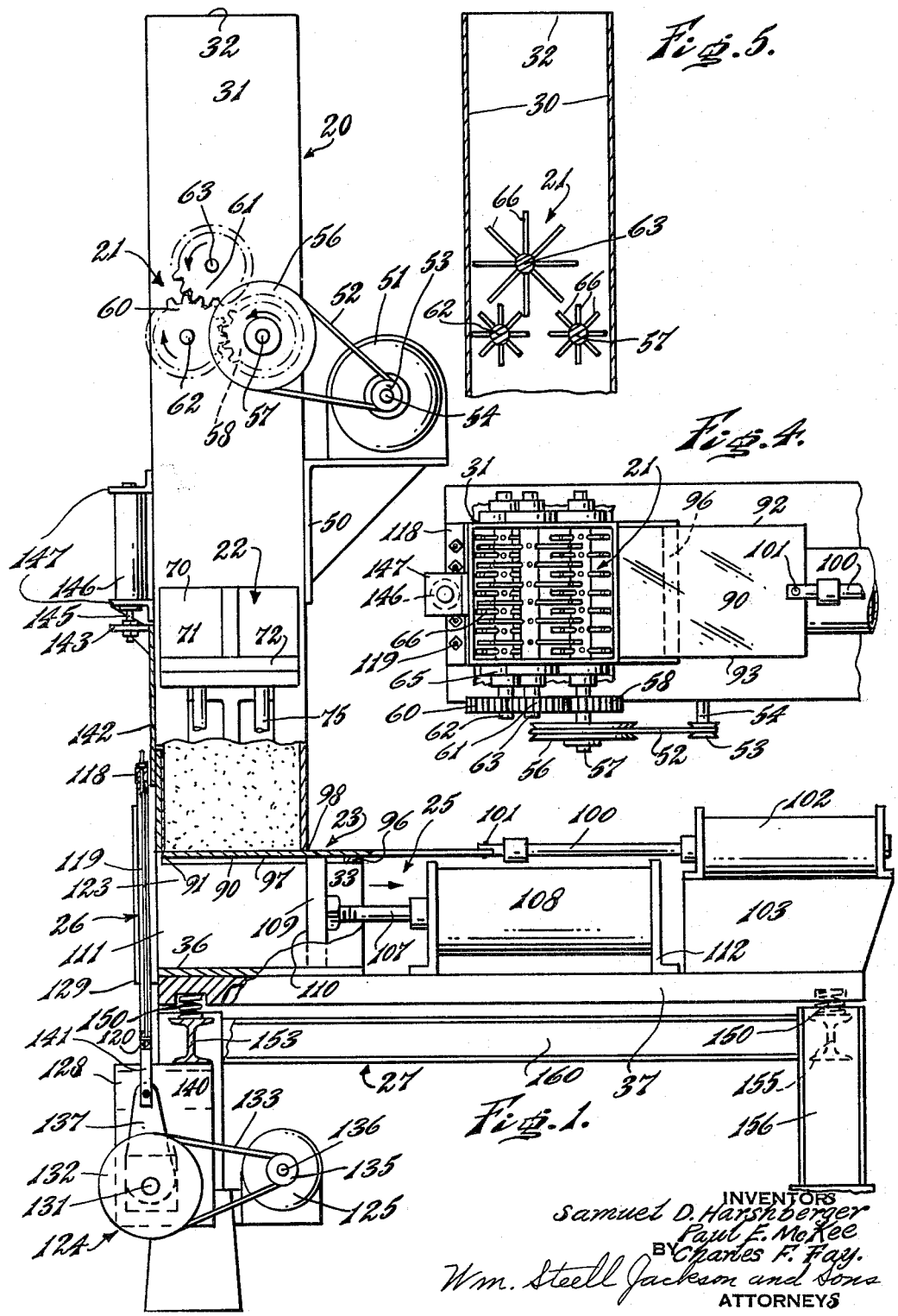
FIGURE 1 is a side elevation of the machine of the invention with the forming chute partially broken away.
Figure 2:
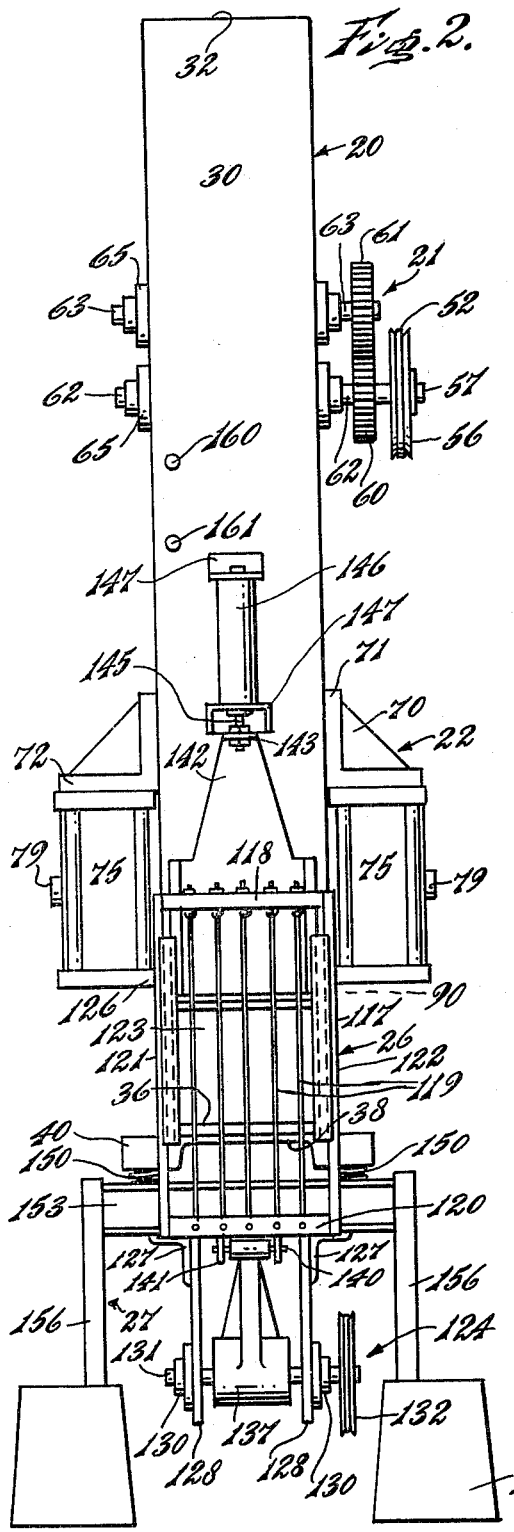
FIGURE 2 is a front elevation of the machine of FIGURE 1.
Figure 3:
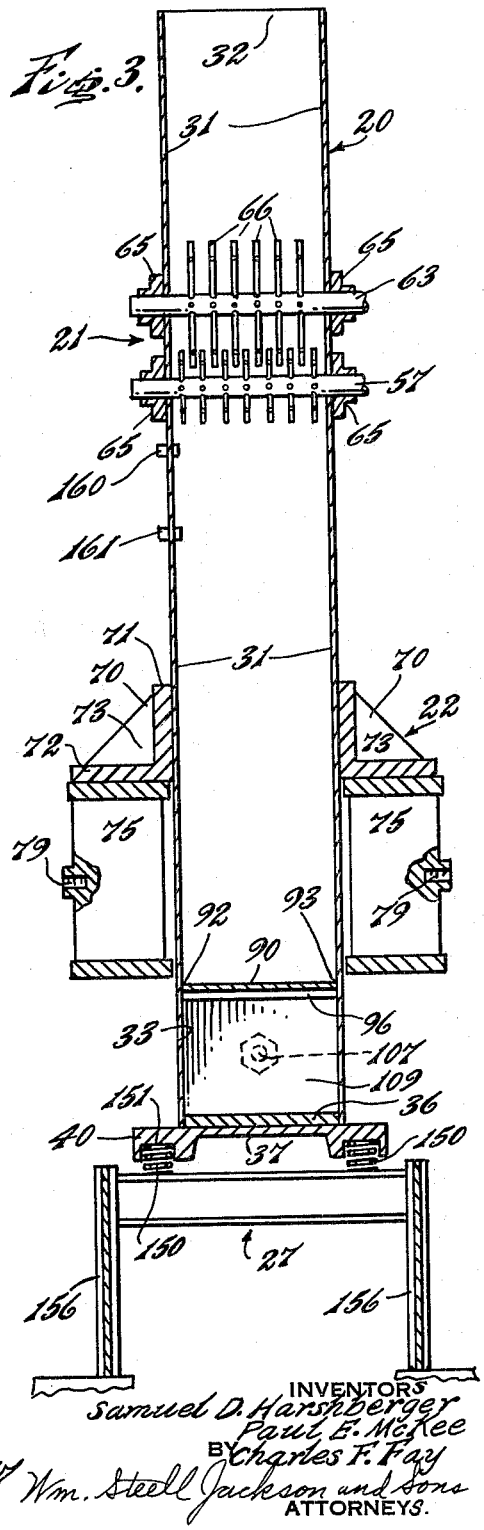
FIGURE 3 is a vertical elevational section of the forming chute with fragments of the vibrators broken away.

Describing in illustration but not in limitation and referring to the drawings:

In the prior art there has been extensive sale made of plastic refractory which has approximately the consistency of common putty. This plastic refractory is intended to be transported to the refractory site in standard packages which can be, for instance, 100 pound bags which contain plastic refractory presliced into blocks and wrapped, for instance, individually in a plastic bag and a cardboard box. The presliced or prepackaged blocks are opened up at the refractory site and are positioned in a wall or roof where they are rammed into shape in place by the use, for instance, of an air hammer. The product then dries in place to form a rigid refractory lining.

In the prior air it has been the practice to form these plastic blocks with a large press which exerts great pressure and which in turn takes a lot of power to operate. The product of the press is then either extruded through extrusion nozzles into the desired small blocks or extruded through a network of wires. The extrusion through the nozzles or through the cutting wires likewise demands a huge power requirement.

In the present invention use is made of the weight of the plastic refractory itself to compact the refractory into a compact plastic rectangular cross section form. The height of the material in the forming chute is an influencing factor upon the density of the block and the level of the shredded material in the forming chute is kept at a suitable level to provide the desired density. Coarse chunks of plastic refractory are taken from a mixing pan and disposed into the open upper end of a vertically disposed forming chute. The material is shredded at the upper part of the chute and then piled up and formed in the lower part of the chute. Vibrators shake the forming chute during the forming of the shredded plastic.

After the bottommost portion of the column has been compacted to a suitable density, a movable column bottom, which acts as a slicing knife as well as a bottom, moves to open up the bottom of the chute, allowing the entire column of plastic within the chute to drop onto a subfloor below the forming column. The movable column bottom then moves back into position cutting a block from the lower end of the compacted column of plastic. The cut block is then forced, in a direction normal to the path of the plastic through the forming chute, by a plunger through vibrating cutting wires. The sliced blocks are subsequently packaged.

Considering the form shown in the drawings, the machine consists of a forming chute 20, a shredder mechanism 21, a vibrator assembly 22, a cutting blade assembly 23, a plunger assembly 25, a saw assembly 26 and a frame 27.

The forming chute is disposed vertically and is rectangular in cross section having transverse sides 30 and longitudinal sides 31. The sides are suitably smooth on the interior so that any material which enters at 32 can readily pass downwardly through the chute. The chute 20 has at its lower end an integral platform 33 which supports a movable mold bottom as will be later explained. The chute 20 has a base 36 resting on a channel 37 having a web 38 and flanges 40. The channel 37 extends rearwardly from the forming chute and supports other elements of the machine and is spring supported from the frame 27 as will be explained.

The shredder assembly 21 is located in the upper portion of chute 20 and comprises a right angle bracket 50 fixed to chute 20 which supports a suitable electric motor 51 energized from an appropriate electrical source. The motor connects through V belt 52 which rides in pulley 53 keyed on motor shaft 55 of the motor 51. As shaft 55 rotates, the V belt 52 is driven and rotates pulley 56 which is keyed on shaft 57 which extends across the interior of the forming chute 20. The shaft 57 has keyed thereon a spur gear 58 which engages gear 60 which in turn engages gear 61. Gears 60 and 61 are keyed respectively to shafts 62 and 63 which extend across the forming chute 20 and are journalled in suitable ball bearings 65 which are bolted or otherwise fixed to the chute sides.

The shafts 57, 62 and 63 have threaded spikes 66 which are spaced to provide longitudinal clearance along the shaft between meshing spikes. The spikes 66 are of suitable length to radially overlap as the shafts rotate. The spikes 66 are angularly positioned along and around the shaft to provide suitable intermeshing and shredding action to break up large chunks of material which are deposited in the chute at 32 as the material passes downward. When operating, the shredder 21 churns the material so that no smooth surfaces or packed chunks of material continue to exist as it passes through the shredder.

The vibrator assembly 22 can be of any suitable type but in the embodiment shown comprises right angle brackets bolted to opposed longitudinal sides of the forming chute. The brackets have a flange 71 bolted to the chute and a flange 72 disposed at right angles to the chute. A stiffener 73 is positioned normal to the flanges 70 and 71. A vibrator 75 of any well known type is bolted by means of bolts and nuts 76 to the flange 72 of bracket 70. Suitable input connections as, for instance, connections for a rotating shaft, are provided at 79. The source of drive for the vibrator is not shown but it may be any conventional types, such as electrical, mechanical, pneumatic or hydraulic.

At the bottom of the forming chute is a cutting blade assembly 23 having a cutting blade 90 in the form of a flat sheet rectangle having a forward cutting edge 91 and sides 92 and 93. The cutting blade 90 rests on the extension 33 of the forming chute 20 which has a horizontal cross piece 96 which supports the cutting blade as it travels from within the chute as at 97 to without the chute as at 98. A piston rod 100 is pivotally secured to the blade 90 at 101 and extends from a double acting pneumatic or hydraulic cylinder 102 which is mounted on platform 103 secured to channel 37.

A rectangular plunger 109 conforming in length to the width of the forming chute 20 and in height to the distance between the blade 90 and the base 36 is fixed on a piston rod 107 which extends from double acting pneumatic or hydraulic cylinder 108 which is adapted to move the plunger from a position at 110 to a position at 111. The cylinder 108 is mounted by means of brackets 112.

The saw assembly 26 comprises a rectangular frame 117 having a top element 118, a bottom element 120, and side pieces 121 and 122. The assembly 26 is attached to the front of the forming chute 20 below the cutting blade 90 in front of a rectangular opening 123 which extends completely across the front side 30 of the forming cute and vertically between cutting blade 90 and the base 36. A cam operated mechanism 124 driven by an electric motor 125 moves the frame 117 up and down rapidly in guides 144 at 126. The cam operated mechanism has angles 127 fixed to the frame 27 which support side plates 128 which mount bearings 130 which journals crankshaft 131.

The rectangular frame 117 has extending vertically in spaced parallel relationship a plurality of cutting wires 119 which are stretched taut and which are suitably fastened at the top and bottom of the rectangular frame. The spacing of the wires corresponds to the desired width of the finished sliced plastic block. The saw wires 119 extend through slotted openings 129 in the base 36 and channel 37.

The shaft 131 has fixed thereon a pulley 132 which receives a V belt 133 which engages pulley 135 on motor shaft 136. A connecting bracket 137 rides at one end on the crank of crankshaft 131 and connects at the other end on shaft 140 journalled at 141 on the lower end of frame 117.

Rectangular opening 123 is selectively covered by sliding door 142, which rides vertically in guides 144. The door is connected at 143 to piston rod 145 extending from double acting cylinder 146 mounted on brackets 147 fixed to the forming chute. Suitable gas or hydraulic pressure lines (not shown) are connected to the cylinder 146.

The channel 37 is suspended on frame 27 by means of helical compression springs 150 which fit in sockets 151 of flanges 40 of the channel 37. There are suitably four springs which are positioned at each of the corners of the channel, whereby the channel, and all the elements the channel supports, are spring supported and free to move with respect to frame 27.

Frame 27 comprises transverse I beams 153 and 155 which are welded or otherwise joined to vertically extending channels 156 secured to, as by embedding, concrete piles 157. Suitable longitudinal I beams 160 extend from the front channels or legs 156 to the rear channels or legs 156 and are suitably secured thereto as by welding.

The helical compression springs 150 at the front of the machine rest on the front transverse I beam 153, and are held thereto as by bolting, and likewise, the rear helical compression springs 150 are fixed or anchored to the rear transverse I beam 155.

In operation, coarse chunks of plastic refractory material are taken from a mixing pan and deposited at 32 into the chute 20. This can be done by any suitable means as by a conveyor. The large chunks of plastic pass through shredding mechanism 21 and are shredded by the intermeshing spikes 66 as the spikes are rotatably intermeshed under the driving action of motor 51. The shredded material drops to the bottom of the forming chute 20 at which time the cutting blade 90 is in a forwardmost position at 97 and forms a bottom over the entire forming chute 20. The sliding door 142 is in a downwardmost position, covering rectangular opening 123. The shredding mechanism 21 churns the material so that no smooth surfaces or packed chunks of material exist, thus creating a material which will bond together on all surfaces.

The cutting blade 90 acts as a temporary bottom. While the forming chute 20 is being filled, the vibrator assemblies 22 are operating, causing the chute 20 as well as all other elements mounted on channel 37 to vibrate. Since the channel 37 is spring mounted, the forming chute vibrates and this tends to pack the shredded material into a solid column above the temporary cutting blade bottom 90. The longer the vibrator is operated, the more dense the column becomes.

A column of plastic is formed which is more dense at the bottom than at the top because the weight of the material itself is a major factor in packing. Since the height of material in the chute is an influencing factor upon the density of the block, the level of shredded material in the forming chute is desirably controlled and kept relatively constant. This can be achieved, for instance, by using spring mounted switches 160 and 161 inside the forming chute which can automatically control whatever feeding mechanism is used to feed the plastic material to the forming chute at 32. These switches 160 and 161 can be, for instance, pressure actuated mercury switches, one of which is placed at a desired point to control the maximum level, and one of which is placed at a desired point to control the minimum level.

After the column of plastic has been formed and packed, a block of plastic is cut from the bottom portion of the column. The vibrator 22 is stopped and the cutting blade on which the column of plastic has rested is withdrawn from the column by activating cylinder 102 to withdraw piston rod 100 to within the cylinder and pull the blade 90 from within the column at 97 to a position wherein the cutting blade is without the column whereby the front cutting edge is at 98.

When the cutting blade 90 is withdrawn, the column is suspended only by friction between the sides of the column of plastic in the inside walls of the forming chute. As the column is packed inside the chute 20, moisture is squeezed from material to the outside faces of the column of plastic. This moisture reduces the force of friction and the weight of the column of plastic causes it to drop past the withdrawn cutting blade 90 and down to the base 36.

In the event that a column hangs within the forming chute after the cutting blade 90 has been withdrawn, the vibrator is operated for a short period to dislodge the column and drop it to the base.

As the column falls anywhere from, for instance, 6 to 9 inches to the base 36, additional packing results when the column lands. The forming chute below the cutting blade 90 and above the base 36 has slightly greater interior dimensions than those of the chute above the blade to allow for swelling of the block. Below the cutting blade 90, only the side walls 31 of the forming chute extend to the bottom, the front wall being terminated to create the rectangular opening 123 and the rear side 30 being terminated to allow a space for the plunger 109 to pass into the forming chute. When the column within the forming chute drops to the base 36, the plunger 109 is positioned vertically below the back wall 30 of the forming chute, and the door 142 is over rectangular opening 123, so that the dropped column is supported on all four sides.

The cut block weight can be closely controlled by accurately adjusting the level of the base 36 as by shimming the base up or down by inserting plates of different thickness.

Once the column lands on the base, the cutting blade at 90 returns to its forwardmost position at 97 and while returning to this position cuts the block from the column at the preset height. For example, if a thick shim is placed beneath the base 36, the resulting block will have less height and therefore have less weight. Smaller weight adjustments can be made by regulating the length of time the vibrators operate to control the density of the compacted column.

Gas or liquid under pressure is introduced into the bottom of cylinder 146, withdrawing piston rod 145, thus sliding door 142 upward, exposing rectangular opening 123.

The next step to be performed is to slice the blocks into easily handled slabs. The electric motor 125 is energized by closing a suitable switch and the motor 125 rotates shaft 131 through pulley 133 to rapidly and quickly oscillate saw wire frame 117 and spaced wires 119 back and forth through connecting brackets 137. The cylinder 108 is then energized to extend piston rod 107 causing plunger 109 to force the cut block through opening 123 through the cam operated saw mechanism 23. The plunger 109 forces the block through the saw wires 119 whereby the cut block creates slices of a width equal to the distance between wires.

The movement of the wires 119 working in a sawing fashion reduces the force necessary to slide the block.

Once the block has been sliced and pushed clear of the forming chute 20, it comes to rest, for instance, on a tray support or on a receiving conveyor after which it is suitably packaged.

The operation is then ready to be repeated to slice another block.

In the alternative embodiment shown in FIGURES 8 to 12 inclusive, the length of the column, and hence the length of the cut block, is controlled to give a varied size block. A movable liner 160 extends parallel to rear wall 30 of the forming chute as seen in FIGURE 8 and abuts against longitudinal walls 31 as best seen in FIGURE 10. The liner 160 is formed of a face sheet 161, a base sheet 162, and flange 163. Support bolts 164 are anchored in countersunk holes as by welding or the like, so as to achieve a flush inner surface. The shanks 165 of the bolts 164 extend through holes 166 in rear wall 31 and are engaged by locknuts 167 and 168 which position the liner any desired distance from the back wall 31. Gauge rods 170 fixed in the liner 160 at 171, 172 and 173 serve to indicate the depth of setting of the liner into the chute.

The flange 163 on the liner 160 extends through hole 175 and serves to guide the plastic refractory into the chute along the liner and away from the rear wall 30.

It will be seen that in operation, the liner 160 will be adjusted by adjusting the nut 167 and locknut 168 to form a chute of a given depth. The depth of the column of plastic, and subsequently the length of the cut block will be determined by the position of the liner 160.

In view of our invention and disclosure, variations and modifications to meet individual whim or particular need will doubtless become evident to others skilled in the art, to obtain all or part of the benefits of our invention without copying the method shown, and we, therefore, claim all such insofar as they wall within the reasonable spirit and scope of our claim.

Having thus described our invention what we claim as new and desire to secure by Letters Patent is:

The method of forming slabs of putty-like plastic refractory, which comprises inserting a flat horizontal cutting blade at the bottom of a vertical forming chute to provide a movable bottom, charging a putty-like plastic refractory into the forming chute and piling the plastic refractory on the movable bottom in the forming chute, thus establishing a vertical column of the plastic refractory in the forming chute, vibrating the forming chute and the column of plastic refractory under its own weight to compact the plastic refractory into a packed column within the lower portions of the chute, withdrawing the cutting blade horizontally and allowing the plastic column to drop to a base beneath the level of the cutting blade in the forming chute, reinserting the cutting blade horizontally within the chute and thereby slicing a block of plastic refractory from the lower end of the packed column, and pushing the block thus cut horizontally and laterally with respect to the vertical column through oscillating cutting wires to slice the cut block into separate slabs.

References Cited by the Examiner

UNITED STATES PATENTS

| | | | |
|---|---|---|---|
| 829,012 | 8/1906 | Jaques | 264—333 XR |
| 1,376,321 | 4/1921 | Crozier | 264—69 |
| 2,057,466 | 10/1936 | Willetts | 264—71 |
| 2,522,936 | 9/1950 | Ferguson | 25—103 XR |
| 2,540,881 | 2/1951 | Hickey | 264—71 XR |

ROBERT F. WHITE, *Primary Examiner.*